US012716410B2

(12) United States Patent
Ren et al.

(10) Patent No.: US 12,716,410 B2
(45) Date of Patent: Aug. 25, 2026

(54) GAS COMPRESSION SYSTEM AND CONTROL METHOD THEREOF

(71) Applicant: Hitachi Industrial Equipment Systems Co., Ltd., Tokyo (JP)

(72) Inventors: Zhijia Ren, Tokyo (JP); Norio Aoyagi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 475 days.

(21) Appl. No.: 18/266,074

(22) PCT Filed: Feb. 5, 2021

(86) PCT No.: PCT/JP2021/004350
§ 371 (c)(1),
(2) Date: Jun. 8, 2023

(87) PCT Pub. No.: WO2022/168270
PCT Pub. Date: Aug. 11, 2022

(65) Prior Publication Data
US 2024/0026874 A1 Jan. 25, 2024

(51) Int. Cl.
*F04B 41/02* (2006.01)
*F04B 49/06* (2006.01)
*G06F 11/07* (2006.01)

(52) U.S. Cl.
CPC ............ *F04B 49/065* (2013.01); *F04B 41/02* (2013.01); *G06F 11/07* (2013.01)

(58) Field of Classification Search
CPC ......... F04B 49/065; F04B 41/02; G06F 11/07
See application file for complete search history.

(56) References Cited

U.S. PATENT DOCUMENTS 6,419,454 B1 * 7/2002 Christiansen ......... F04B 49/065 417/4
2007/0077151 A1 * 4/2007 Hirasawa .............. F04B 49/022 417/5

(Continued)

FOREIGN PATENT DOCUMENTS

JP 09-149061 A 6/1997
JP 2003-021072 A 1/2003

(Continued)

OTHER PUBLICATIONS

International Search Report, PCT/JP2021/004350, Apr. 13, 2021, 2 pgs.

*Primary Examiner* — Scott T Baderman
*Assistant Examiner* — Mario M Velez-Lopez
(74) *Attorney, Agent, or Firm* — Volpe Koenig

(57) ABSTRACT

A gas compression system that can continue control of the number of operated pieces of a compressor even when an abnormality has occurred and a control method thereof are provided. The gas compression system includes compressors, a number-of-pieces controller that executes master control to control the number of operated pieces of the compressor, and a communication network that connects the compressors and the number-of-pieces controller with each other in a mutually communicable manner. Each compressor includes a compressor main unit that compresses a gas and a controller that executes slave control to control the compressor main unit in response to a command from the number-of-pieces controller. The respective controllers are configured to determine whether an abnormality of the number-of-pieces controller or an abnormality of communication with the number-of-pieces controller has occurred on the basis of whether a safety notification from the (Continued)

number-of-pieces controller is received and transmit a master declaration.

4 Claims, 6 Drawing Sheets

(56) References Cited

U.S. PATENT DOCUMENTS

| | | | | |
|---|---|---|---|---|
| 2012/0046801 | A1 * | 2/2012 | Mori | F24H 15/219<br>700/300 |
| 2014/0140813 | A1 * | 5/2014 | Ochi | F04D 13/12<br>415/13 |
| 2015/0370265 | A1 * | 12/2015 | Ren | F04C 14/02<br>137/565.29 |
| 2021/0348603 | A1 | 11/2021 | Nakajima et al. | |

FOREIGN PATENT DOCUMENTS

| | | | | |
|---|---|---|---|---|
| JP | 2012-042127 | A | 3/2012 | |
| JP | 2014-152699 | A | 8/2014 | |
| WO | WO-2005072221 | A2 * | 8/2005 | B63B 13/00 |
| WO | 2020/084939 | A1 | 4/2020 | |

* cited by examiner

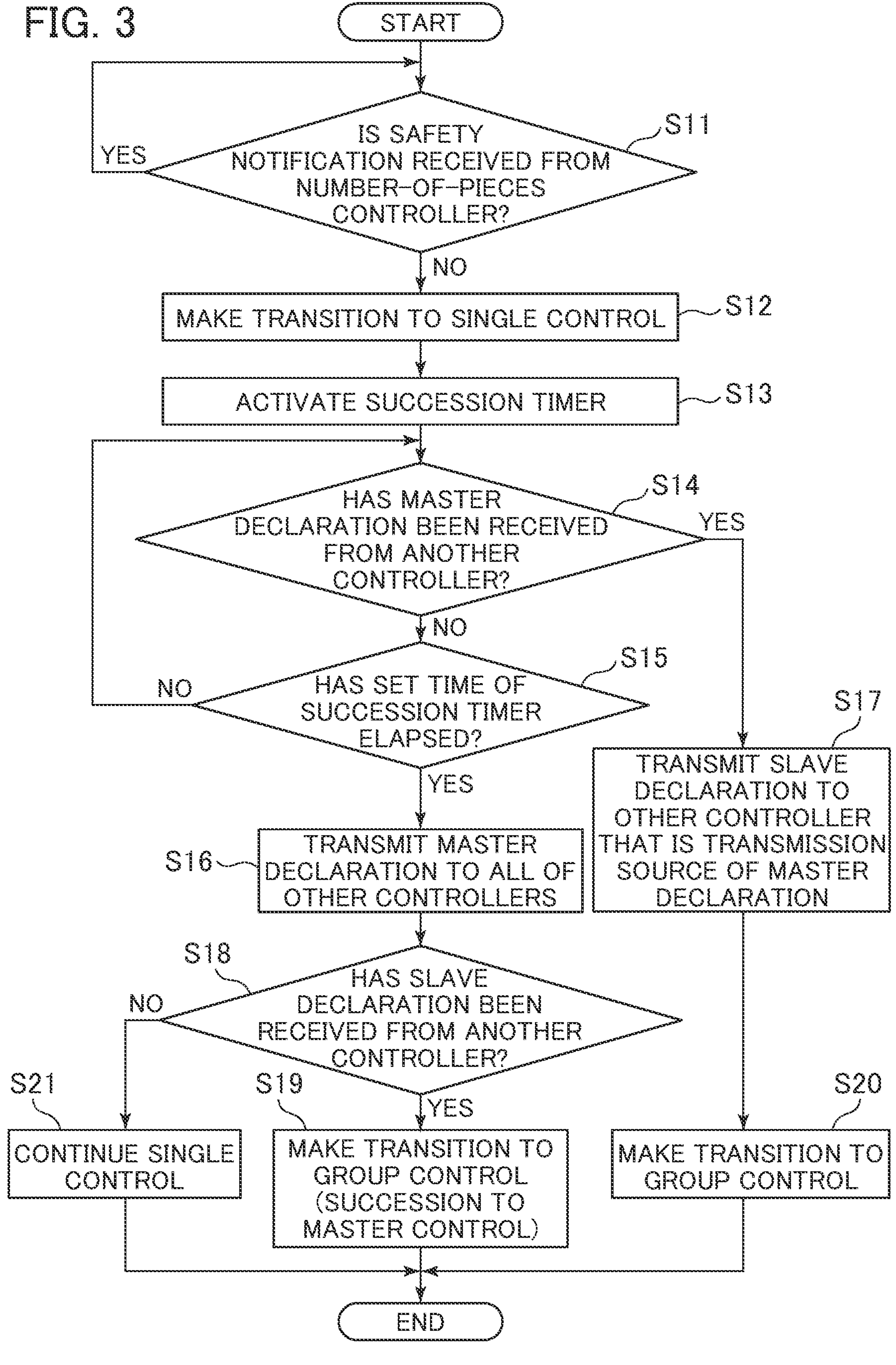
FIG. 3
START
IS SAFETY NOTIFICATION RECEIVED FROM NUMBER-OF-PIECES CONTROLLER?
S11
YES
NO
MAKE TRANSITION TO SINGLE CONTROL
S12
ACTIVATE SUCCESSION TIMER
S13
HAS MASTER DECLARATION BEEN RECEIVED FROM ANOTHER CONTROLLER?
S14
YES
NO
HAS SET TIME OF SUCCESSION TIMER ELAPSED?
S15
NO
YES
TRANSMIT SLAVE DECLARATION TO OTHER CONTROLLER THAT IS TRANSMISSION SOURCE OF MASTER DECLARATION
S17
TRANSMIT MASTER DECLARATION TO ALL OF OTHER CONTROLLERS
S16
HAS SLAVE DECLARATION BEEN RECEIVED FROM ANOTHER CONTROLLER?
S18
NO
YES
CONTINUE SINGLE CONTROL
S21
MAKE TRANSITION TO GROUP CONTROL (SUCCESSION TO MASTER CONTROL)
S19
MAKE TRANSITION TO GROUP CONTROL
S20
END

FIG. 6

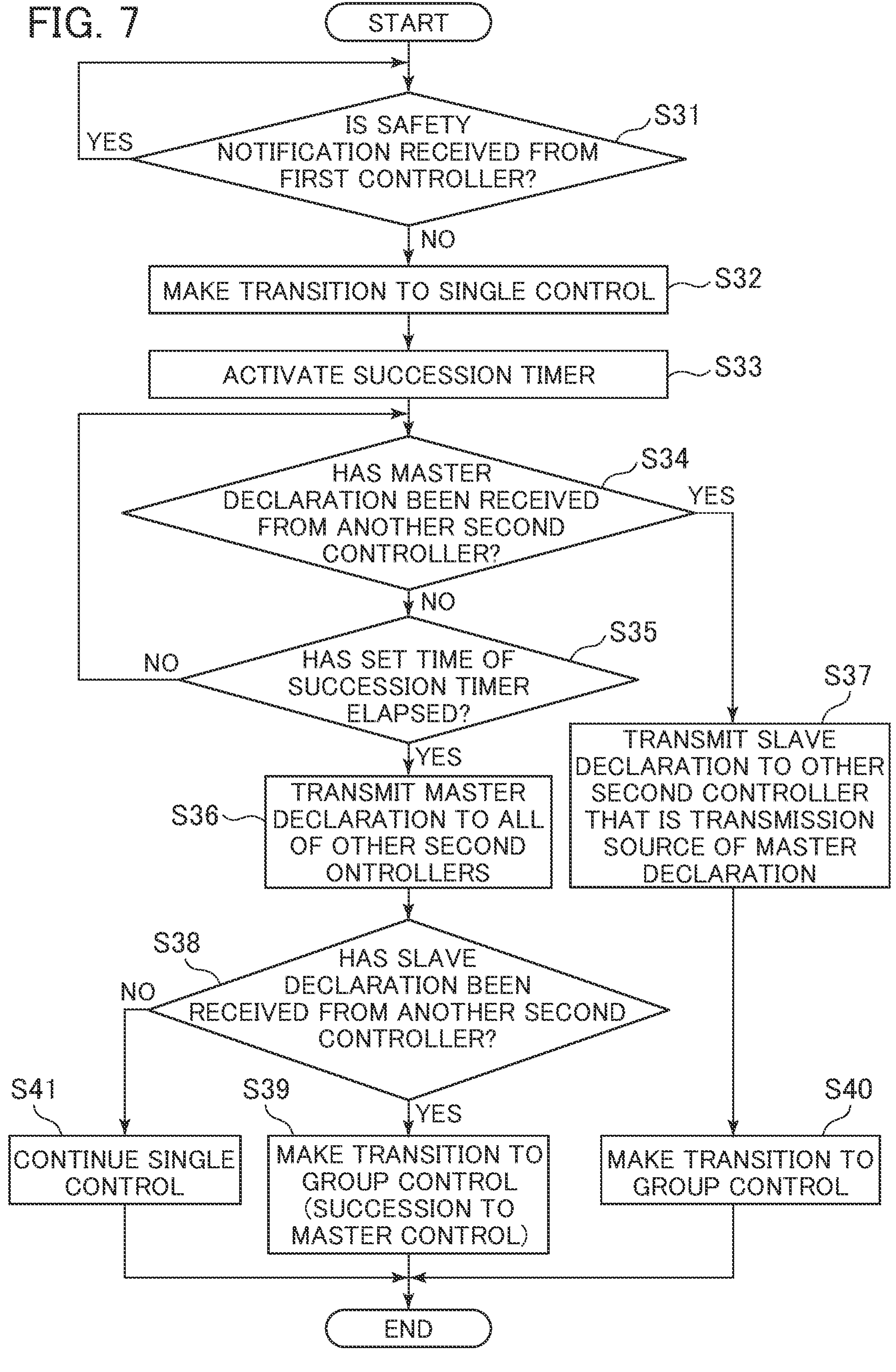
FIG. 7
START
IS SAFETY NOTIFICATION RECEIVED FROM FIRST CONTROLLER?
S31
YES
NO
MAKE TRANSITION TO SINGLE CONTROL
S32
ACTIVATE SUCCESSION TIMER
S33
HAS MASTER DECLARATION BEEN RECEIVED FROM ANOTHER SECOND CONTROLLER?
S34
YES
NO
HAS SET TIME OF SUCCESSION TIMER ELAPSED?
S35
NO
YES
TRANSMIT MASTER DECLARATION TO ALL OF OTHER SECOND ONTROLLERS
S36
TRANSMIT SLAVE DECLARATION TO OTHER SECOND CONTROLLER THAT IS TRANSMISSION SOURCE OF MASTER DECLARATION
S37
HAS SLAVE DECLARATION BEEN RECEIVED FROM ANOTHER SECOND CONTROLLER?
S38
NO
YES
CONTINUE SINGLE CONTROL
S41
MAKE TRANSITION TO GROUP CONTROL (SUCCESSION TO MASTER CONTROL)
S39
MAKE TRANSITION TO GROUP CONTROL
S40
END

GAS COMPRESSION SYSTEM AND CONTROL METHOD THEREOF

TECHNICAL FIELD

The present invention relates to a gas compression system and a control method thereof.

BACKGROUND ART

In the industry, with use of a gas compression system, a compressed gas is supplied to a production line to execute production activity. The gas compression system includes a plurality of compressors. Due to this, it is possible to supply the compressed gas to the production line and continue the production activity even when any of the plurality of compressors breaks. Furthermore, it is possible to intend energy saving through increasing or decreasing the number of operated pieces of the compressor according to the operation situation of the production line.

As methods for controlling the number of operated pieces of the compressor, there are a method based on master control by a number-of-pieces controller disposed separately from a plurality of compressors (this method is a general number-of-pieces control type and is referred to as a centralized control type) and a method based on master control by a controller incorporated in any of a plurality of compressors (this method is referred to as a group control type). Patent document 1 discloses a gas compression system of the group control type. This gas compression system makes the number-of-pieces controller unnecessary and therefore can intend reduction in the cost.

The gas compression system of patent document 1 includes a plurality of compressors composed of a first compressor and a plurality of second compressors, and a communication network that connects the plurality of compressors with each other in a mutually communicable manner. The first compressor includes a first compressor main unit that compresses air and a first controller that executes master control to control the number of operated pieces of the compressor and slave control to control the first compressor main unit in conjunction with this master control. Each second compressor includes a second compressor main unit that compresses air and a second controller that executes slave control to control the second compressor main unit in response to a command from the first controller.

The first controller of the first compressor transmits a setting change signal to the second controllers of the plurality of second compressors when the first compressor (in detail, equipment other than the first controller) has broken. The second controller of each second compressor stores the order of priority of master control succession in advance. If the second compressor with the highest priority has not broken, the second controller thereof is selected in response to the setting change signal and succeeds to the master control. This allows continuation of the control of the number of operated pieces of the compressor.

PRIOR ART DOCUMENT

Patent Document

Patent Document 1: JP-2003-21072-A

SUMMARY OF THE INVENTION

Problem to be Solved by the Invention

In the gas compression system of the group control type in patent document 1, the setting change signal is transmitted from the first controller of the first compressor to the second controllers of the second compressors and the second controller succeeds to the master control in response to this setting change signal. Thus, when an abnormality of the first controller has occurred or when an abnormality of communication between the first controller and the second controllers has occurred, the second controllers cannot receive the setting change signal and cannot succeed to the master control. Therefore, it is impossible to continue the control of the number of operated pieces of the compressor.

The case is assumed in which the technique of master control succession in patent document 1 is employed for a gas compression system of the centralized control type. In this gas compression system, the setting change signal is transmitted from a number-of-pieces controller to controllers of compressors and the controller succeeds to the master control in response to this setting change signal. Thus, when an abnormality of the number-of-pieces controller has occurred or when an abnormality of communication between the number-of-pieces controller and the controllers has occurred, the controllers cannot receive the setting change signal and cannot succeed to the master control. Therefore, it is impossible to continue the control of the number of operated pieces of the compressor.

The present invention is made in view of the above-described matter and one of subjects thereof is to continue control of the number of operated pieces of the compressor even when the above-described abnormality has occurred.

Means for Solving the Problem

In order to solve the above-described problem, a configuration set forth in the scope of claims is applied. The present invention includes a plurality of means for solving the above-described problem. To cite one example thereof, in a gas compression system that includes: a plurality of compressors; a common tank that stores a compressed gas supplied from the plurality of compressors; a number-of-pieces controller that executes master control to control the number of operated pieces of the compressor; and a communication network that connects the plurality of compressors and the number-of-pieces controller with each other in a mutually communicable manner, each of the plurality of compressors including a compressor main unit that compresses a gas, a controller that executes slave control to receive a command from the number-of-pieces controller and control the compressor main unit, and an individual tank that stores a compressed gas, the respective controllers are configured to determine whether an abnormality of the number-of-pieces controller or an abnormality of communication with the number-of-pieces controller has occurred on the basis of whether a safety notification from the number-of-pieces controller is received, begin a single control operation of the compressor when determining that the abnormality has occurred, and after a predetermined time has elapsed, transmit a master declaration to succeed to the master control to other controller other than itself.

Advantages of the Invention

According to the present invention, it is possible to continue the control of the number of operated pieces of the compressor even when the abnormality has occurred.

Problems, configurations, and effects other than the above will be made clear by the following description.

BRIEF DESCRIPTION OF THE DRAWINGS

FIG. 3 is a flowchart that represents the processing procedure of master control succession in the first embodiment of the present invention.

FIG. 6 is a schematic diagram that represents the configuration of a gas compression system in a second embodiment of the present invention.

FIG. 7 is a flowchart that represents the processing procedure of master control succession in the second embodiment of the present invention.

MODES FOR CARRYING OUT THE INVENTION

A first embodiment of the present invention will be described with reference to drawings.

Figure 1:
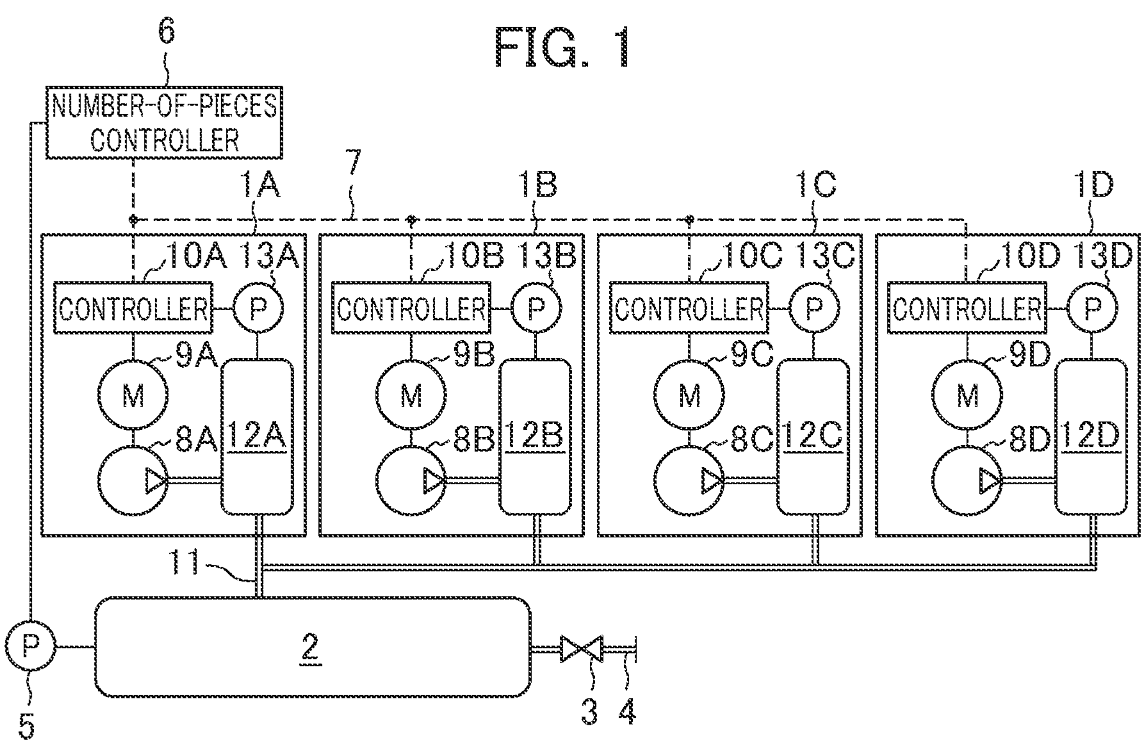
FIG. 1 is a schematic diagram that represents the configuration of a gas compression system in a first embodiment of the present invention.

FIG. 1 is a schematic diagram that represents the configuration of a gas compression system in the present embodiment.

The gas compression system of the present embodiment includes four compressors 1A, 1B, 1C, and 1D and a reservoir tank 2 that stores a compressed gas (in detail, for example, compressed air) delivered from the compressors 1A, 1B, 1C, and 1D, and supplies the compressed gas from the reservoir tank 2 to a production line (not illustrated) through a take-off valve 3 and a supply conduit 4.

Furthermore, the gas compression system of the present embodiment is the centralized control type and includes a pressure sensor 5 that senses the pressure in the reservoir tank 2, a number-of-pieces controller 6 that executes master control to control the number of operated pieces of the compressor on the basis of the pressure sensed by the pressure sensor 5, and a communication network 7 of a wired type or wireless type that connects the compressors 1A, 1B, 1C, and 1D and the number-of-pieces controller 6 with each other in a mutually communicable manner.

The number-of-pieces controller 6 has, although details are not illustrated, for example, a memory that stores a program and settings, a processor that executes processing on the basis of the program and the settings, a communication interface that interposes between the processor and the communication network 7, and a user interface (in detail, for example, touch panel). The user interface displays information on the compressors 1A, 1B, 1C, and 1D acquired through the communication network 7 and allows a user to input settings.

The compressor 1A includes a compressor main unit 8A that compresses a gas (in detail, for example, air), a motor 9A that drives the compressor main unit 8A, a controller 10A that executes slave control to control the motor 9A in response to a command from, for example, the number-of-pieces controller 6 and hence control the compressor main unit 8A, a tank 12A that is disposed on the delivery side of the compressor main unit 8A and is connected to the reservoir tank 2 through a conduit 11, a pressure sensor 13A that senses the pressure in the tank 12A, and a user interface (in detail, for example, display and pressing button) that is not illustrated. The pressure sensed by the pressure sensor 13A is almost the same as the pressure sensed by the pressure sensor 5.

The controller 10A has, although details are not illustrated, for example, a memory that stores a program and settings, a processor that executes processing on the basis of the program and the settings, and a communication interface that interposes between the processor and the communication network 7. The user interface displays information on the compressor 1A and allows a user to input settings.

The compressors 1B, 1C, and 1D have a configuration similar to that of the compressor 1A. Specifically, the compressor 1B includes a compressor main unit 8B, a motor 9B, a controller 10B, a tank 12B, a pressure sensor 13B, and a user interface. The compressor 1C includes a compressor main unit 8C, a motor 9C, a controller 10C, a tank 12C, a pressure sensor 13C, and a user interface. The compressor 1D includes a compressor main unit 8D, a motor 9D, a controller 10D, a tank 12D, a pressure sensor 13D, and a user interface.

The number-of-pieces controller 6 periodically (for example, every 10 seconds) transmits a request signal to the controller 10A of the compressor 1A, the controller 10B of the compressor 1B, the controller 10C of the compressor 1C, and the controller 10D of the compressor 1D through the communication network 7. The controller of each compressor (that is, the controller 10A of the compressor 1A, the controller 10B of the compressor 1B, the controller 10C of the compressor 1C, or the controller 10D of the compressor 1D) transmits an answer signal (in detail, for example, what includes information indicating whether pieces of equipment such as the compressor main unit, the motor, and the pressure sensor are in a normal state) to the number-of-pieces controller 6 in response to the request signal.

The number-of-pieces controller 6 determines whether an abnormality of the controller of each compressor or an abnormality of communication with the controller of each compressor has occurred on the basis of whether the answer signal from the controller of each compressor is received. Furthermore, when receiving the answer signal from the controller of each compressor, the number-of-pieces controller 6 determines whether each compressor is in a normal state on the basis of information included in the answer signal. Moreover, the number-of-pieces controller 6 executes the master control (that is, control of the number of operated pieces of the compressor) while grasping the compressors that become the control target by using the result of the above-described determination.

Figure 2:
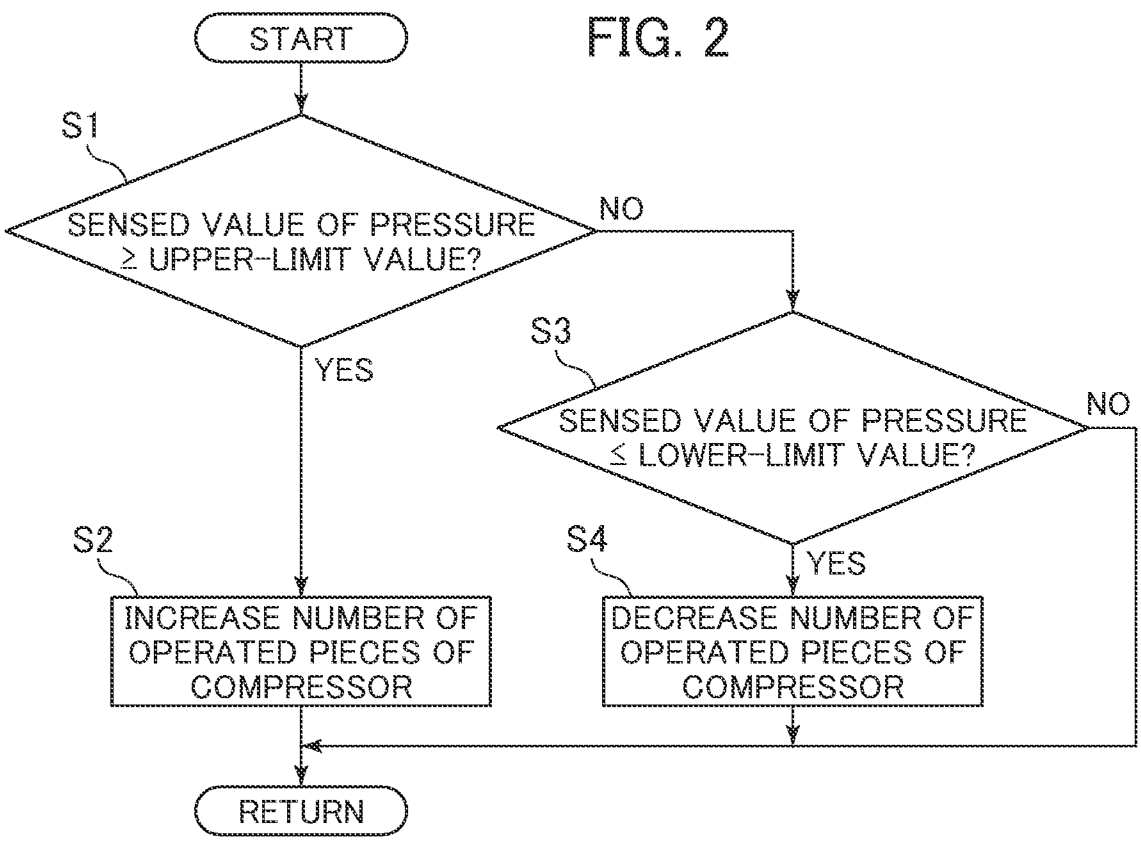
FIG. 2 is a flowchart that represents the processing procedure of master control in the first embodiment of the present invention.

Details of the master control of the present embodiment will be described with use of FIG. 2. FIG. 2 is a flowchart that represents the processing procedure of the master control in the present embodiment.

The number-of-pieces controller 6 controls the number of operated pieces of the compressor such that the pressure sensed by the pressure sensor 5 falls within a predetermined range. Specifically, the number-of-pieces controller 6 determines whether the pressure sensed by the pressure sensor 5 has risen to an upper-limit value Pu set in advance (step S1). Furthermore, when the pressure sensed by the pressure sensor 5 has risen to the upper-limit value Pu, the numberof-pieces controller 6 outputs a command to stop any of the compressors currently driven. The controller of the compressor stops the compressor main unit in response to the above-described stop command. This decreases the number of operated pieces of the compressor (step S2).

Moreover, the number-of-pieces controller 6 determines whether the pressure sensed by the pressure sensor 5 has lowered to a lower-limit value Pd (Pd<Pu) set in advance (step S3). Furthermore, when the pressure sensed by the pressure sensor 5 has lowered to the lower-limit value Pd, the number-of-pieces controller 6 outputs a command to drive any of the compressors currently stopped. The controller of the compressor drives the compressor main unit in response to the above-described driving command. This increases the number of operated pieces of the compressor (step S4).

Here, as a characteristic of the present embodiment, the controller of each compressor determines whether an abnormality of the number-of-pieces controller 6 or an abnormality of communication with the number-of-pieces controller 6 has occurred on the basis of whether the request signal (safety notification) from the number-of-pieces controller 6 is received. Moreover, when the above-described abnormality has occurred, any of the controller 10A of the compressor 1A, the controller 10B of the compressor 1B, the controller 10C of the compressor 1C, and the controller 10D of the compressor 1D succeeds to the master control. In the present embodiment, the user sets the order of priority of master control succession in advance by using the user interface of the number-of-pieces controller 6 or the user interface of the compressor.

Details of the master control succession of the present embodiment will be described with use of FIG. 3. FIG. 3 is a flowchart that represents the processing procedure of the master control succession in the present embodiment.

The controller of each compressor (that is, the controller 10A of the compressor 1A, the controller 10B of the compressor 1B, the controller 10C of the compressor 1C, or the controller 10D of the compressor 1D) periodically determines whether an abnormality of the number-of-pieces controller 6 or an abnormality of communication with the number-of-pieces controller 6 has occurred on the basis of whether the safety notification from the number-of-pieces controller 6 is received (step S11).

When determining that the above-described abnormality has occurred, the controller of each compressor makes a transition to single control (step S12) and activates a succession timer (step S13). Description will be made about the single control by taking as an example the case in which the controller 10A of the compressor 1A has made a transition to the single control. The controller 10A of the compressor 1A controls the compressor main unit 8A such that the pressure sensed by the pressure sensor 13A falls within the predetermined range. That is, the controller 10A stops the compressor main unit 8A when the pressure sensed by the pressure sensor 13A has risen to the upper-limit value Pu, and drives the compressor main unit 8A when the pressure sensed by the pressure sensor 13A has lowered to the lower-limit value Pd.

The set time of the succession timer is set on the basis of the order of priority of master control succession. For example, when the priority of the controller 10A of the compressor 1A is at the first rank, the set time of the succession timer thereof is set to (T×1). When the priority of the controller 10B of the compressor 1B is at the second rank, the set time of the succession timer thereof is set to (T×2). When the priority of the controller 10C of the compressor 1C is at the third rank, the set time of the succession timer thereof is set to (T×3). When the priority of the controller 10D of the compressor 1D is at the fourth rank, the set time of the succession timer thereof is set to (T×4) (for example, T=1 second). Due to this, the setting is made in such a manner that a master declaration to succeed to the master function is transmitted at an earlier timing as the priority is higher.

The controller of each compressor determines whether the master declaration from the other controller other than itself has been received until the set time of the succession timer elapses (step S14). Furthermore, when the set time of the succession timer has elapsed without receiving the master declaration from the other controller, the controller transmits the master declaration to all of the other controllers (steps S15 and S16).

The controller of each compressor transmits, when receiving the master declaration from the other controller other than itself before the set time of the succession timer elapses, a slave declaration (in detail, declaration to control the compressor main unit in response to a command from the other controller) to the controller that is the transmission source of the master declaration, and does not transmit the master declaration (step S17).

The controller that has transmitted the master declaration grasps the compressor that becomes the control target, by receiving the slave declaration from the other controller other than itself. Thereafter, the controller succeeds to the master control and makes a transition to group control (steps S18 and S19). The controller that has transmitted the slave declaration makes a transition to group control by receiving the driving command or the stop command from the controller that is the transmission source of the master declaration (step S20). The controller that has transmitted the master declaration continues the single control when the slave declaration from the other controller other than itself is not received (step S21).

Next, operation and effects of the present embodiment will be described.

Figure 4:
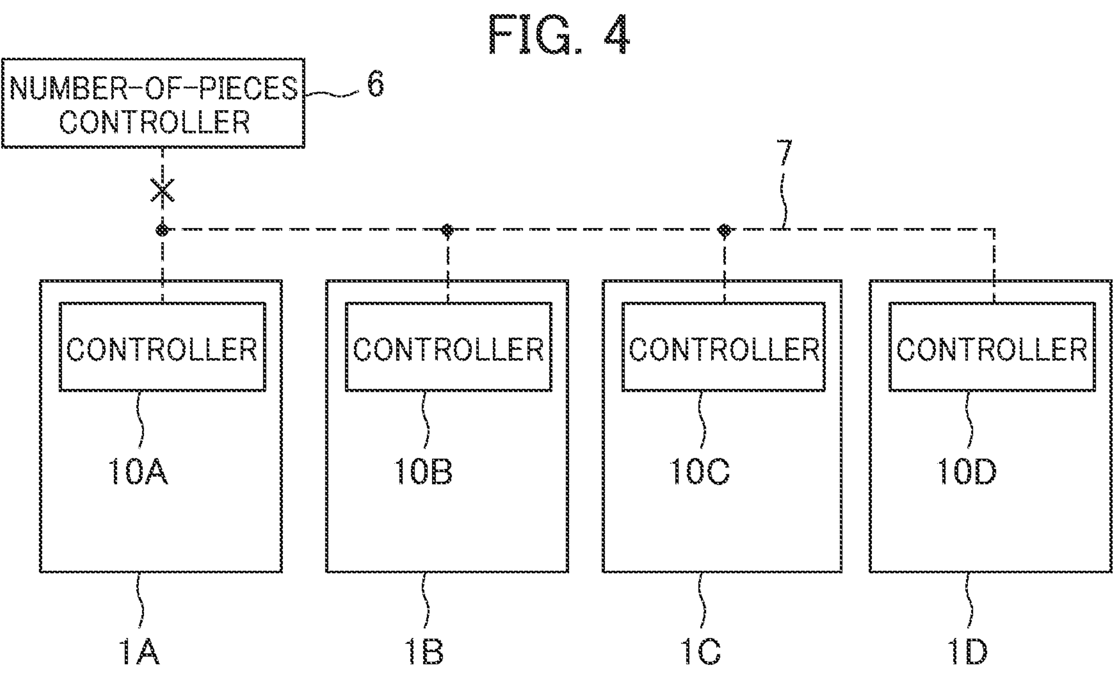
FIG. 4 is a diagram for explaining one example of operation of the first embodiment of the present invention.

For example, the case is assumed in which, as illustrated in FIG. 4, an abnormality of communication between the compressors 1A, 1B, 1C, and 1D and the number-of-pieces controller 6 has occurred and mutual communication of the compressors 1A, 1B, 1C, and 1D is normal.

The number-of-pieces controller 6 does not receive the answer signal from the controller 10A of the compressor 1A, the controller 10B of the compressor 1B, the controller 10C of the compressor 1C, and the controller 10D of the compressor 1D and thus stops the master control. The controller 10A of the compressor 1A, the controller 10B of the compressor 1B, the controller 10C of the compressor 1C, and the controller 10D of the compressor 1D do not receive the safety notification from the number-of-pieces controller 6 and thus determines that an abnormality of the number-of-pieces controller 6 or an abnormality of communication with the number-of-pieces controller 6 has occurred. Thereafter, because the priority of the compressor 1A in the compressors 1A, 1B, 1C, and 1D is the highest, the master declaration is transmitted from the controller 10A of the compressor 1A to the controller 10B of the compressor 1B, the controller 10C of the compressor 1C, and the controller 10D of the compressor 1D. In response to this, the slave declarations are transmitted from the controller 10B of the compressor 1B, the controller 10C of the compressor 1C, and the controller 10D of the compressor 1D to the controller 10A of the compressor 1A. Thereafter, the controller 10A of the compressor 1A succeeds to the master control. Therefore, the control of the number of operated pieces of the compressor can be continued. As a result, energy saving can be intended.

Figure 5:
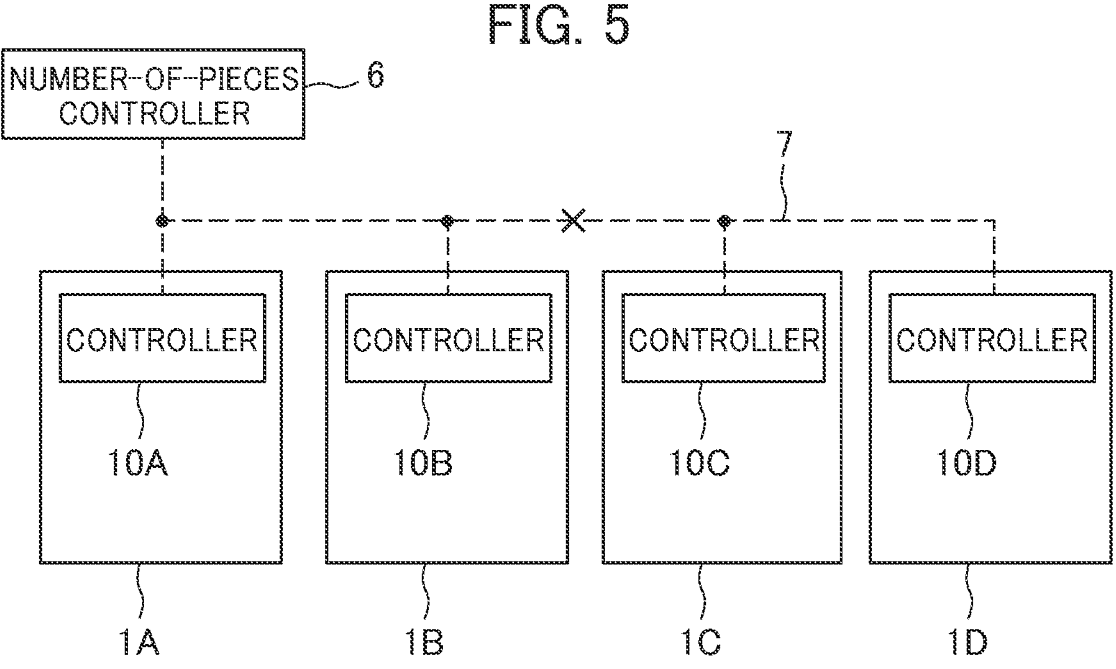
FIG. 5 is a diagram for explaining another example of the operation of the first embodiment of the present invention.

Moreover, for example, the case is assumed in which, as illustrated in FIG. 5, an abnormality of communication between the compressors 1C and 1D and the number-of-pieces controller 6 has occurred and communication between the compressors 1A and 1B and the number-of-pieces controller 6 is normal and mutual communication of the compressors 1C and 1D is normal.

The number-of-pieces controller 6 does not receive the answer signal from the controller 10C of the compressor 1C and the controller 10D of the compressor 1D although receiving the answer signal from the controller 10A of the compressor 1A and the controller 10B of the compressor 1B, and thus reduces the control target to the compressors 1A and 1B. The controller 10C of the compressor 1C and the controller 10D of the compressor 1D do not receive the safety notification from the number-of-pieces controller 6 and thus determines that an abnormality of the number-of-pieces controller 6 or an abnormality of communication with the number-of-pieces controller 6 has occurred. Thereafter, because the priority of the compressor 1C in the compressors 1C and 1D is the highest, the master declaration is transmitted from the controller 10C of the compressor 1C to the controller 10D of the compressor 1D. In response to this, the slave declaration is transmitted from the controller 10D of the compressor 1D to the controller 10C of the compressor 1C. Thereafter, the controller 10C of the compressor 1C succeeds to the master control. Therefore, the control of the number of operated pieces of the compressor can be continued. As a result, energy saving can be intended.

In the first embodiment, description has been made by taking as an example the case in which the order of priority of the compressors 1A to 1D regarding master control succession is set by the user. However, the configuration is not limited thereto and the order of priority may be set by the number-of-pieces controller 6, for example. This modification example will be described.

The number-of-pieces controller 6 acquires, for example, the year and month of manufacturing, the cumulative operation time, the number of times of occurrence of breakdown, and the serial number regarding the compressor, as information included in the answer signal from the controller of each compressor, besides the information indicates whether pieces of equipment such as the compressor main unit, the motor, and the pressure sensor are in a normal state. Then, before control start or periodically, the number-of-pieces controller 6 sets the order of priority on the basis of the year and month of manufacturing, the cumulative operation time, the number of times of occurrence of breakdown, and the serial number described above for the compressors that become the control target (in detail, compressors in which an abnormality of the controller or an abnormality of communication with the number-of-pieces controller 6 has not occurred and pieces of equipment are in a normal state).

Specifically, for example, the setting is made such that the priority of the compressor becomes higher as the year and month of manufacturing of the compressor is later. When the year and month of manufacturing of the compressor is the same, for example, the setting is made such that the priority of the compressor becomes higher as the rate of occurrence of breakdown calculated based on the cumulative operation time and the number of times of occurrence of breakdown regarding the compressor is lower. The rate of occurrence of breakdown of the compressor may be calculated with execution of weighting of the number of times of occurrence of breakdown according to the kind of breakdown (in detail, for example, the place of breakdown, such as the motor or the pressure sensor). When the rate of occurrence of breakdown regarding the compressor is the same, the setting is made such that the priority of the compressor becomes higher as the cumulative operation time of the compressor is shorter. When the cumulative operation time of the compressor is the same, the setting is made such that the priority of the compressor becomes higher as the serial number of the compressor is smaller.

The number-of-pieces controller 6 transmits the above-described order of priority of the respective compressors to the controller of each compressor. The controller of each compressor sets the set time of the succession timer according to the order of priority.

Also in the above-described modification example, effects similar to those of the first embodiment can be obtained.

Furthermore, in the first embodiment, details have not been described regarding the request signal transmitted from the number-of-pieces controller 6 to the controller 10A of the compressor 1A, the controller 10B of the compressor 1B, the controller 10C of the compressor 1C, and the controller 10D of the compressor 1D. However, the request signal may include, for example, any of a sensed value of the pressure in the reservoir tank 2, the upper-limit value and the lower-limit value of the pressure, the current clock time, the number of pieces of the normal compressor, and the order of priority of the compressors 1A to 1D, as the information that should be shared by the respective controllers.

A second embodiment of the present invention will be described with reference to drawings. In the present embodiment, a part equivalent to a part in the first embodiment is given the same numeral and description thereof is omitted as appropriate.

Figure 6:
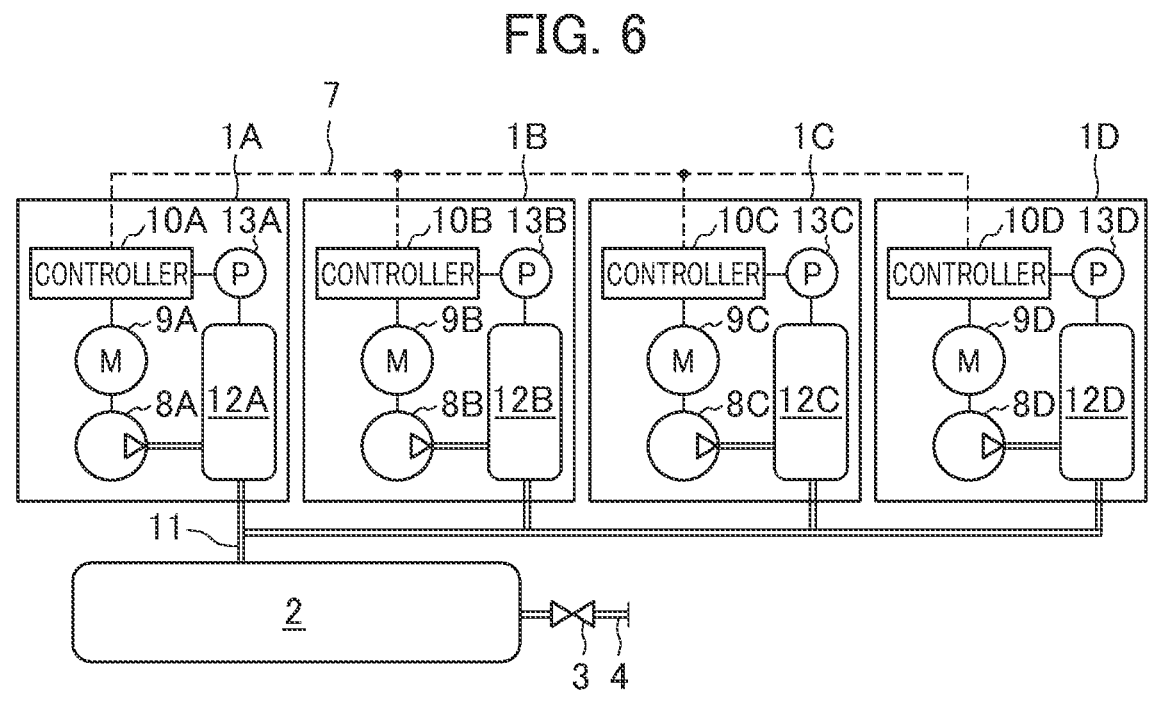

FIG. 6 is a schematic diagram that represents the configuration of a gas compression system in the present embodiment.

The gas compression system of the present embodiment is the group control type and is configured to control the number of operated pieces of the compressor by a master function of the controller 10A of the compressor 1A, and makes the number-of-pieces controller 6 unnecessary.

The compressor 1A is equivalent to the first compressor set forth in the scope of claims. The compressor main unit 8A is equivalent to the first compressor main unit set forth in the scope of claims. The controller 10A is equivalent to the first controller set forth in the scope of claims. Thus, hereinafter, description will be made with these constituent elements referred to as "first compressor 1A," "first compressor main unit 8A," and "first controller 10A." Furthermore, the compressor 1B, 1C, or 1D is equivalent to the second compressor set forth in the scope of claims. The compressor main unit 8B, 8C, or 8D is equivalent to the second compressor main unit set forth in the scope of claims. The controller 10B, 10C, or 10D is equivalent to the second controller set forth in the scope of claims. Thus, hereinafter, description will be made with these constituent elements referred to as "second compressors 1B, 1C, and 1D," "second compressor main units 8B, 8C, and 8D," and "second controllers 10B, 10C, and 10D."

The first controller 10A of the first compressor 1A periodically (for example, every 10 seconds) transmits a request signal to the second controller 10B of the second compressor 1B, the second controller 10C of the second compressor 1C, and the second controller 10D of the second compressor 1D through the communication network 7. The second controller of each second compressor (that is, the second controller 10B of the second compressor 1B, the second controller 10C of the second compressor 1C, or the second controller 10D of the second compressor 1D) transmits an answer signal (in detail, for example, what includes information indicating whether pieces of equipment such as the compressor main unit, the motor, and the pressure sensor are in a normal state) to the first controller 10A of the first compressor 1A in response to the request signal.

The first controller 10A of the first compressor 1A determines whether an abnormality of the second controller of each second compressor or an abnormality of communication with the second controller of each second compressor has occurred on the basis of whether the answer signal from the second controller of each second compressor is received. Furthermore, when receiving the answer signal from the second controller of each second compressor, the first controller 10A of the first compressor 1A determines whether each second compressor is in a normal state on the basis of information included in the answer signal. Moreover, the first controller 10A of the first compressor 1A executes the master control (that is, control of the number of operated pieces of the compressor) while grasping the second compressors that become the control target by the result of the above-described determination in addition to the first compressor that is the control target.

The first controller 10A of the first compressor 1A controls the number of operated pieces of the compressor such that the pressure sensed by the pressure sensor 13A falls within a predetermined range. Specifically, the first controller 10A of the first compressor 1A determines whether the pressure sensed by the pressure sensor 13A has risen to the upper-limit value Pu set in advance. Furthermore, when the pressure sensed by the pressure sensor 13A has risen to the upper-limit value Pu, the first controller 10A of the first compressor 1A outputs a command to stop any of the second compressors currently driven. The second controller of the second compressor stops the compressor main unit in response to the above-described stop command. Alternatively, the first controller 10A of the first compressor 1A stops the compressor main unit 8A when the compressor main unit 8A is currently driven. This decreases the number of operated pieces of the compressor.

Moreover, the first controller 10A of the first compressor 1A determines whether the pressure sensed by the pressure sensor 13A has lowered to the lower-limit value Pd ($Pd<Pu$) set in advance. Furthermore, when the pressure sensed by the pressure sensor 13A has lowered to the lower-limit value Pd, the first controller 10A of the first compressor 1A outputs a command to drive any of the second compressors currently stopped. The second controller of the second compressor drives the compressor main unit in response to the above-described driving command. Alternatively, the first controller 10A of the first compressor 1A drives the compressor main unit 8A when the compressor main unit 8A is currently stopped. This increases the number of operated pieces of the compressor.

Here, as a characteristic of the present embodiment, the second controller of each second compressor determines whether an abnormality of the first controller 10A or an abnormality of communication with the first controller 10A has occurred on the basis of whether the request signal (safety notification) from the first controller 10A of the first compressor 1A is received. Moreover, when the above-described abnormality has occurred, any of the second controller 10B of the second compressor 1B, the second controller 10C of the second compressor 1C, and the second controller 10D of the second compressor 1D succeeds to the master control. In the present embodiment, the user sets the order of priority of master control succession in advance by using the user interface of the compressor.

Details of the master control succession of the present embodiment will be described with use of FIG. 7. FIG. 7 is a flowchart that represents the processing procedure of the master control succession in the present embodiment.

The second controller of each second compressor (that is, the second controller 10B of the second compressor 1B, the second controller 10C of the second compressor 1C, or the second controller 10D of the second compressor 1D) periodically determines whether an abnormality of the first controller 10A or an abnormality of communication with the first controller 10A has occurred on the basis of whether the safety notification from the first controller 10A of the first compressor 1A is received (step S31).

When determining that the above-described abnormality has occurred, the second controller of each second compressor makes a transition to single control (step S32) and activates a succession timer (step S33). Description will be made about the single control by taking as an example the case in which the second controller 10B of the second compressor 1B has made a transition to the single control. The second controller 10B of the second compressor 1B controls the second compressor main unit 8B such that the pressure sensed by the pressure sensor 13B falls within the predetermined range. That is, the second controller 10B stops the second compressor main unit 8B when the pressure sensed by the pressure sensor 13B has risen to the upper-limit value Pu, and drives the second compressor main unit 8B when the pressure sensed by the pressure sensor 13B has lowered to the lower-limit value Pd.

The set time of the succession timer is set based on the order of priority of master control succession. For example, when the priority of the second controller 10B of the second compressor 1B is at the first rank, the set time of the succession timer thereof is set to ($T\times1$). When the priority of the second controller 10C of the second compressor 1C is at the second rank, the set time of the succession timer thereof is set to ($T\times2$). When the priority of the second controller 10D of the second compressor 1D is at the third rank, the set time of the succession timer thereof is set to ($T\times3$) (for example, $T=1$ second). Due to this, the setting is made in such a manner that a master declaration to succeed to the master function is transmitted at an earlier timing as the priority is higher.

The second controller of each second compressor determines whether the master declaration from the other second controller other than itself has been received until the set time of the succession timer elapses (step S34). Furthermore, when the set time of the succession timer has elapsed without receiving the master declaration from the other second controller, the second controller transmits the master declaration to all of the other second controllers (steps S35 and S36).

The second controller of each second compressor transmits, when receiving the master declaration from the other second controller other than itself before the set time of the succession timer elapses, a slave declaration (in detail, declaration to control the compressor main unit in response to a command from the other second controller) to the second controller that is the transmission source of the master declaration, and does not transmit the master declaration (step S37).

The second controller that has transmitted the master declaration grasps the second compressor that becomes the control target, by receiving the slave declaration from the other second controller other than itself. Thereafter, the second controller succeeds to the master control and makes a transition to group control (steps S38 and S39). The second controller that has transmitted the slave declaration makes a transition to group control by receiving the driving command or the stop command from the second controller that is the transmission source of the master declaration (step S40). The second controller that has transmitted the master declaration continues the single control when the slave declaration from another second controller other than itself is not received (step S41).

Next, operation and effects of the present embodiment will be described.

Figure 8:
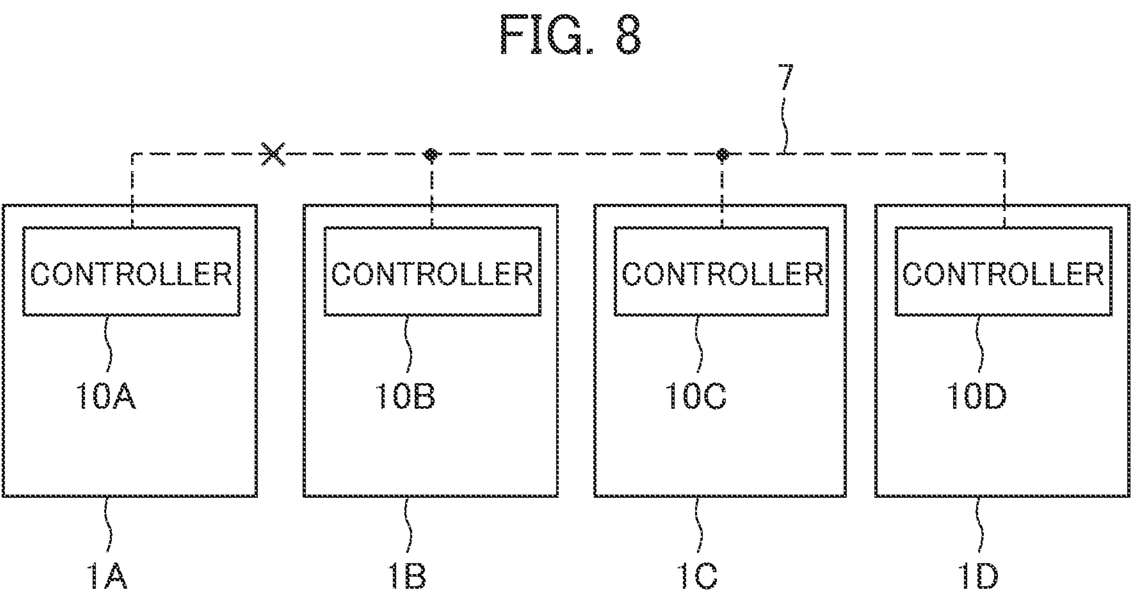
FIG. 8 is a diagram for explaining one example of operation of the second embodiment of the present invention.

For example, the case is assumed in which, as illustrated in FIG. 8, an abnormality of communication between the second compressors 1B, 1C, and 1D and the first compressor 1A has occurred and mutual communication of the second compressors 1B, 1C, and 1D is normal.

The first controller 10A of the first compressor 1A does not receive the answer signal from the second controller 10B of the second compressor 1B, the second controller 10C of the second compressor 1C, and the second controller 10D of the second compressor 1D and thus stops the master control and makes a transition to single operation. The second controller 10B of the second compressor 1B, the second controller 10C of the second compressor 1C, and the second controller 10D of the second compressor 1D do not receive the safety notification from the first controller 10A of the first compressor 1A and thus determines that an abnormality of the first controller 10A or an abnormality of communication with the first controller 10A has occurred. Thereafter, because the priority of the second compressor 1B in the second compressors 1B, 1C, and 1D is the highest, the master declaration is transmitted from the second controller 10B of the second compressor 1B to the second controller 10C of the second compressor 1C and the second controller 10D of the second compressor 1D. In response to this, the slave declarations are transmitted from the second controller 10C of the second compressor 1C and the second controller 10D of the second compressor 1D to the second controller 10B of the second compressor 1B. Thereafter, the second controller 10B of the second compressor 1B succeeds to the master control. Therefore, the control of the number of operated pieces of the compressor can be continued. As a result, energy saving can be intended.

Figure 9:
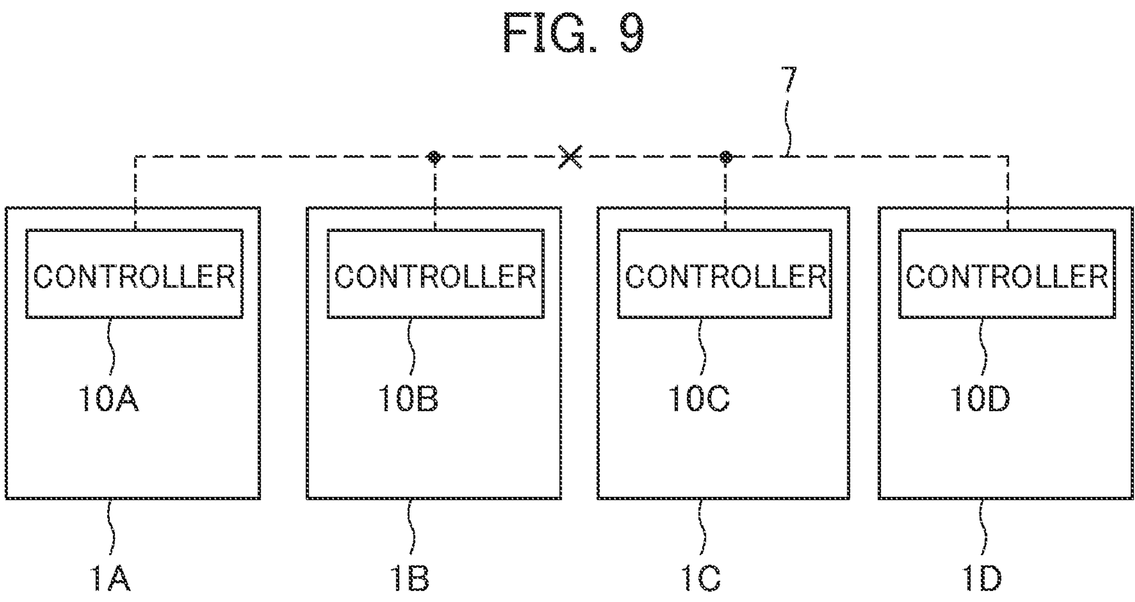
FIG. 9 is a diagram for explaining another example of the operation of the second embodiment of the present invention.

Moreover, for example, the case is assumed in which, as illustrated in FIG. 9, an abnormality of communication between the second compressors 1C and 1D and the first compressor 1A has occurred and communication between the second compressor 1B and the first compressors 1A is normal and mutual communication of the second compressors 1C and 1D is normal.

The first controller 10A of the first compressor 1A does not receive the answer signal from the second controller 10C of the second compressor 1C and the second controller 10D of the second compressor 1D although receiving the answer signal from the second controller 10B of the second compressor 1B, and thus reduces the control target to the compressors 1A and 1B. The second controller 10C of the second compressor 1C and the second controller 10D of the second compressor 1D do not receive the safety notification from the first controller 10A of the first compressor 1A and thus determines that an abnormality of the first controller 10A or an abnormality of communication with the first controller 10A has occurred. Thereafter, because the priority of the second compressor 1C in the second compressors 1C and 1D is the highest, the master declaration is transmitted from the second controller 10C of the second compressor 1C to the second controller 10D of the second compressor 1D. In response to this, the slave declaration is transmitted from the second controller 10D of the second compressor 1D to the second controller 10C of the second compressor 1C. Thereafter, the second controller 10C of the second compressor 1C succeeds to the master control. Therefore, the control of the number of operated pieces of the compressor can be continued without decrease in the maximum value of the number of operated pieces of the compressor.

In the first embodiment, it has been explained that the controller 10A of the compressor 1A succeeds to the master control when an abnormality of communication between the compressors 1A, 1B, 1C, and 1D and the number-of-pieces controller 6 has occurred as illustrated in FIG. 4, for example, whereas details of subsequent operation have not been explained. However, by use of a method similar to that in the second embodiment, any of the controller 10B of the compressor 1B, the controller 10C of the compressor 1C, and the controller 10D of the compressor 1D may succeed to the master control when an abnormality of the controller 10A of the compressor 1A or the like has occurred.

Furthermore, in the first and second embodiments, description has been made by taking as an example the cases in which the gas compression system includes four compressors. However, the configuration is not limited thereto and the gas compression system may include two, three, or five or more compressors.

DESCRIPTION OF REFERENCE CHARACTERS

1A, 1B, 1C, 1D: Compressor
6: Number-of-pieces controller
7: Communication network
8A, 8B, 8C, 8D: Compressor main unit
10A, 10B, 10C, 10D: Controller

The invention claimed is:

1. A gas compression system comprising:
a plurality of compressors;
a common tank that stores a compressed gas supplied from the plurality of compressors;
a number-of-pieces controller that executes master control to control a number of operated pieces of a respective compressor among the plurality of compressors; and
a communication network that connects the plurality of compressors and the number-of-pieces controller with each other in a mutually communicable-manner,
each of the plurality of compressors including a compressor main unit that compresses a gas, a controller that executes slave control to receive a command from the number-of-pieces controller and control the compressor main unit, and an individual tank that stores a compressed gas, wherein:
respective controllers are configured to:
determine whether an abnormality of the number-of-pieces controller or an abnormality of communication with the number-of-pieces controller has occurred on a basis of whether a safety notification from the number-of-pieces controller is received,
begin a single control operation of the respective compressor when determining that the abnormality has occurred,
transmit a master declaration to another controller at a time that is earlier for a controller having a higher priority to succeed to the master control, and succeed to the master control in a case of receiving a slave declaration from another controller, otherwise, continue the single control operation of the respective compressor.

2. A gas compression system comprising:

a plurality of compressors including a first compressor and a plurality of second compressors;

a common tank that stores a compressed gas supplied from the plurality of compressors; and a communication network that connects the plurality of compressors with each other in a mutually communicable manner, the first compressor including a first compressor main unit that compresses a gas, a first controller that executes master control to control number of operated pieces of the first compressor and slave control to control the first compressor main unit in conjunction with the master control, and an individual tank that stores a compressed gas, each of the plurality of second compressors including a second compressor main unit that compresses the gas, a second controller that executes slave control to receive a command from the first controller and control the second compressor main unit, and an individual tank that stores a compressed gas, wherein:

respective second controllers are configured to:

determine whether an abnormality of the first controller or an abnormality of communication with the first controller has occurred on a basis of whether a safety notification from the first controller is received, begin a single control operation of at least one of the second compressors when determining that the abnormality has occurred, then, transmit a master declaration to another second controller at a time that is earlier for a second controller having a higher priority to succeed to the master control, then, succeed to the master control in a case of receiving a slave declaration from another second controller, otherwise, continue the single control operation of the at least one of the second compressors.

3. A control method of a gas compression system, the control method comprising: controlling a number of operating compressors by executing master control by a number-of-pieces controller disposed separately from a plurality of respective compressors; and controlling a compressor main unit incorporated in each of the plurality of respective compressors in response to a command from the number-of-pieces controller by executing slave control by a controller incorporated in each of the respective plurality of compressors, wherein:

respective controllers;

determine whether an abnormality of the number-of-pieces controller or an abnormality of communication with the number-of-pieces controller has occurred on a basis of whether a safety notification from the number-of-pieces controller is received, begin a single control operation of the compressor when determining that the abnormality has occurred, transmit a master declaration to another controller at a time that is earlier for a controller having a higher priority to succeed to the master control, and succeed to the master control in a case of receiving a slave declaration from another controller, otherwise, continue the single control operation of the compressor.

4. A control method of a gas compression system, the control method comprising:

controlling a number of operating compressors by executing master control by a first controller incorporated in a first compressor that is one of a plurality of the compressors, controlling a first compressor main unit incorporated in the first compressor by executing slave control by the first controller in conjunction with the master control executed by the first controller, and controlling a second compressor main unit incorporated in each of a plurality of second compressors, in response to a command from the first controller by executing slave control by a second controller incorporated in each of the plurality of second compressors, wherein respective second controllers are configured to:

determine whether an abnormality of the first controller or an abnormality of communication with the first controller has occurred on a basis of whether a safety notification from the first controller is received, begin a single control operation of the respective second compressor when determining that the abnormality has occurred, transmit a master declaration to another second controller at a time that is earlier for a second controller having a higher priority to succeed to the master control, and succeed to the master control in a case of receiving a slave declaration from another second controller, otherwise, continue the single control operation of the respective second compressors.

* * * * *